(12) United States Patent
Mutreja et al.

(10) Patent No.: US 10,541,882 B2
(45) Date of Patent: Jan. 21, 2020

(54) TELEMETRY DRIVEN CONFIGURATION IN COMPUTING SYSTEMS

(71) Applicant: Microsoft Technology Licensing, LLC, Redmond, WA (US)

(72) Inventors: Tanu Mutreja, Redmond, WA (US); Ashvinkumar J. Sanghvi, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 203 days.

(21) Appl. No.: 15/269,878

(22) Filed: Sep. 19, 2016

(65) Prior Publication Data
US 2018/0083841 A1 Mar. 22, 2018

(51) Int. Cl.
*H04L 12/24* (2006.01)
*G06F 16/9535* (2019.01)
*G06F 8/71* (2018.01)
*H04L 29/08* (2006.01)
*H04L 29/06* (2006.01)

(52) U.S. Cl.
CPC ............... *H04L 41/20* (2013.01); *G06F 8/71* (2013.01); *G06F 16/9535* (2019.01); *H04L 67/34* (2013.01); *H04L 67/42* (2013.01); *H04L 67/306* (2013.01)

(58) Field of Classification Search
None
See application file for complete search history.

(56) References Cited

U.S. PATENT DOCUMENTS

| | | |
|---|---|---|
| 8,005,803 B2 | 8/2011 | Graefe et al. |
| 8,799,423 B2 | 8/2014 | Thompson et al. |
| 9,026,995 B2 | 5/2015 | Spassov et al. |
| 9,116,771 B2 | 8/2015 | Hoy et al. |
| 9,219,648 B1 | 12/2015 | Chheda et al. |
| 2006/0190486 A1* | 8/2006 | Zhou ............... G06Q 10/06 |
| 2006/0190714 A1 | 8/2006 | Vaszary et al. |
| 2009/0235267 A1 | 9/2009 | McKinney et al. |

(Continued)

FOREIGN PATENT DOCUMENTS

| | | |
|---|---|---|
| RU | 2365993 C1 * | 8/2009 |
| WO | 2015145883 A1 | 10/2015 |

OTHER PUBLICATIONS

Khanse, Anand, "Manage Windows 10 Telemetry and Data Collection settings", Published on: May 3, 2016 Available at: http://www.thewindowsclub.com/windows-10-telemetry.

(Continued)

*Primary Examiner* — Younes Naji
(74) *Attorney, Agent, or Firm* — Liang IP, PLLC

(57) ABSTRACT

Techniques for facilitating telemetry driven configuration of software products in computing systems are disclosed herein. In one embodiment, a method can include transmitting an indication of a software product entering a configuration mode for a configuration parameter of the software product to a server. The method can also include receiving, from the server, a list of values for the configuration parameter each previously adopted by additional users for the same configuration parameter of the software product and displaying, on a user interface, the received list of values for the configuration parameter and indicating that one of the displayed values in the list is most commonly adopted by the additional users.

20 Claims, 7 Drawing Sheets

(56) References Cited

U.S. PATENT DOCUMENTS

| | | | |
|---|---|---|---|
| 2009/0251728 A1* | 10/2009 | Fukasawa | G06F 3/1204 358/1.15 |
| 2012/0030526 A1* | 2/2012 | Matsuda | H04L 41/0869 714/57 |
| 2013/0024203 A1 | 1/2013 | Flores et al. | |
| 2013/0253885 A1 | 9/2013 | Birnkrant et al. | |
| 2013/0263111 A1 | 10/2013 | Boss et al. | |
| 2014/0012797 A1 | 1/2014 | Rao et al. | |
| 2014/0317031 A1 | 10/2014 | Babenko et al. | |
| 2014/0372980 A1* | 12/2014 | Verma | G06F 9/4451 717/121 |
| 2015/0089297 A1* | 3/2015 | Johnson | G06F 11/3672 714/38.1 |
| 2015/0128239 A1* | 5/2015 | Kakutani | H04L 63/083 726/7 |
| 2016/0085566 A1 | 3/2016 | Benzaia et al. | |

OTHER PUBLICATIONS

"International Search Report and Written Opinion Issued in PCT Application No. PCT/US2017/051239", dated Oct. 26, 2017, 14 Pages.

* cited by examiner

US 10,541,882 B2

TELEMETRY DRIVEN CONFIGURATION IN COMPUTING SYSTEMS

BACKGROUND

Operating systems, applications, or other software products can provide many settings, options, selections, or other configuration parameters for users to specify. Some of these configuration parameters are designed to suite particular environments or preferences of users. For example, an operating system on a smartphone can provide options for users to specify a power profile on the smartphone. The power profile can include how long before the smartphone turns off a screen when idle. Other configuration parameters, however, can affect functioning of a software product. For example, an email application on a smartphone may not operate correctly if a user incorrectly specifies network configuration parameters on the smartphone.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Software developers or vendors often collect anonymous telemetry information of software products or services for understanding configuration, usage, operating health, performance, or other attributes. For example, a software application installed on a smartphone can transmit, with user consent, installation parameters, operating conditions, data/network usage, or other suitable data to a software vendor via the Internet. The software vendor can then analyze the received user data to extract insights on how the software application is installed or used, in what configuration(s) the software application performs properly, and/or other suitable information that can help improve features and/or performance of the software application.

While software developers or vendors can use such telemetry information for improving software products, little or none of such telemetry information is available to end users of the software products. For example, when a user is prompted to choose a setting during installation, the user has no information regarding values for the same setting selected by other users. Some of these settings may be designed to suite particular preferences of users. As such, selection of a particular value for the setting may not affect overall operations of a software product. Other settings, however, can potentially render a software product functioning poorly or even non-functional. For example, an email client may fail to retrieve/send emails if values for network configuration parameters (e.g., port, authentication settings, etc.) are specified incorrectly.

Several embodiments of the disclosed technology can make telemetry insights available or visible to end users so that the end users can make data driven decisions in order to reduce or even avoid configuration errors. In certain implementations, upon user consent, a telemetry server can collect telemetry information anonymously from multiple users via the Internet or other suitable computer networks. The telemetry information can be related to profiles of computing environments (e.g., operation system, application version/build, etc.), configuration/settings of software products operating in the computing environments, or other suitable information. The telemetry server can then process and store the collected telemetry information in a data store.

During installation and/or configuration of a software product in a computing device, the telemetry server can provide a user with information regarding values or selections that have been used by other users for a configuration parameter. For example, with user consent, the telemetry server can receive a profile of a computing environment on the computing device. Based on the received profile of the computing environment, the telemetry server can determine a list of values or selections related to the setting of the software product based on overall usage, usage trend, or other suitable criteria. For example, the telemetry server can generate a list of power thresholds (e.g., 10%, 20%, etc.) at which a computing device goes into a sleep mode. The telemetry server can also include adoption rates of the individual power thresholds. For instance, 10% is most commonly used while 20% is second mostly commonly used by other users. The telemetry server can then transmit the determined list of values to the computing device which in turn outputs the values to the user along with respectively adoption rates. In certain embodiments, based on the displayed options, the user can select one of the values from the displayed list as a value for the setting. In other embodiments, the mostly commonly used value can be pre-filled into a dropdown menu, a radio button, or other suitable types of input field associated with the setting on the computing device.

Several embodiments of the disclosed technology can thus help users to reduce or even avoid errors when configuring software products. For example, by providing users with what or how other users are or have been using the same or similar software product, the telemetry server can help users to gauge where a potential choice/value stands in a spectrum of choices/values. As such, a user who is new to a software product can have confidence in that certain setting options are relative "safe," whereas others may cause potential errors. As a result, configuration errors in software products can be reduced, and user experience of software products can be improved when compared to certain techniques.

DETAILED DESCRIPTION

Figure 1:
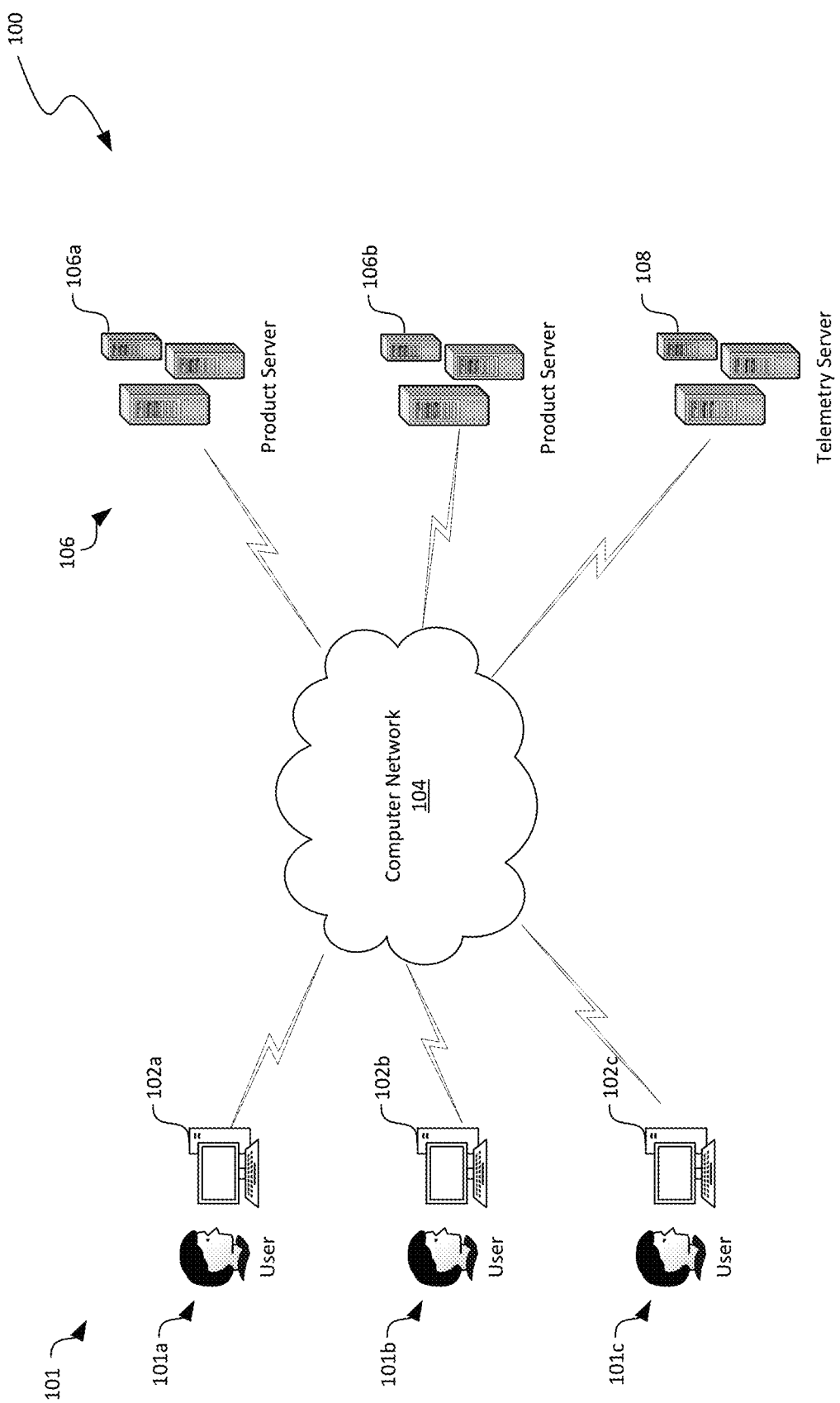
FIG. 1 is a schematic diagram of a computing system implementing telemetry driven configuration of software products in accordance with embodiments of the disclosed technology.

Certain embodiments of computing systems, devices, components, modules, routines, and processes for facilitating operations between a public cloud and a private cloud are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-5.

As used herein, the term "software product" refers to a software application, a feature of a software application, a feature of an operating system, or other suitable types of standalone or integrated software program designed to perform one or more functions, tasks, or activities for benefit of users. For example, a software product can include an email client, a word processor, a spreadsheet application, or other suitable types of standalone application. In another example, a software product can also include a power management tool as a component of an operating system for managing power configurations of a computer, smartphone, or other computing devices.

An "operating environment" generally refers to an environment in which users can run various application software. Example operating environments can be associated with particular user interfaces as well application programming interfaces ("APIs"), internal memory (e.g., RAM) configuration/status, CPU speeds, operating systems installed, versions of various software applications, country and language of operations, or other suitable operating conditions. In certain examples, an operating environment can include an operating system. In other examples, an operating environment may not include a full operating system but can be a form of middleware that rests between the operating system and applications executing on top of the operation system. For instance, the middleware can include a graphic user interface laid over a command-line based operating system.

Also used herein, a "configuration parameter" or "setting parameter" generally refers to adjustable parameters or variable related to certain aspects of functioning of a software product. For example, a configuration parameter of an operating system can include a language setting, a date/time setting, a daylight savings time setting, or other suitable settings. A configuration parameter can be associated with multiple values or states. For example, a language setting for an operating system can include values such as English, Chinese, Swahili, or other languages. In another example, a daylight saving time setting can include either "on" or "off."

In addition, as used herein, "telemetry information" generally refers to data representing usage, configuration, performance, or other suitable information related to a software product or a software environment by multiple users. Telemetry information can be generated by receiving data from individual users and aggregate the received data to derive the data representing usage, configuration, performance, or other suitable information. In certain embodiments, telemetry information can include one or more values for a configuration parameter of the software product or software environment. The one or more values have been adopted by the multiple users. In other embodiments, telemetry information can also be processed to derive one or more adoption rate associated with the one or more values. For instance, a most commonly adopted value (e.g., "English" for a language setting) can have an adoption rate of 95% in the United States. In further embodiments, telemetry information can also be processed to derive a ranking, a trend, or other suitable information related to the values of the configuration parameters.

In certain embodiments, telemetry information can be collected anonymously or non-anonymously with user consent. For example, during installation, a software product can prompt a user for participating or opt out the telemetry information collection process. While consenting for telemetry collection, users can choose to send the information anonymously or non-anonymously. Upon user consent, the software product can then transmit telemetry information to a telemetry server via the Internet or other suitable network. When the collected telemetry information is not anonymous, the telemetry information can be anonymized at the software product or at the telemetry server to remove all personal identification information to safeguard personal privacy of the users. In other embodiments, telemetry information can be collected from beta testing, survey results, or data generated from related internal or external researches, internal deployments, theoretical survey results, previous versions of same or related products, or other suitable sources.

As used herein, the term "adoption rate" generally refers to a rate at which users adopt certain values or selections related to a configuration parameter. For example, when six out of ten users adopt a single value for a configuration parameter, the adoption rate of the signal value is 60%. As such, a most commonly used value would have the highest adoption rate, and vice versa. In other examples, adoption rates can also be represented as decimals, fractions, or other suitable notations.

In certain computing systems, little or no telemetry information related to software products is available to end users. When a user is prompted to choose a setting during installation, the user has no information regarding values selected by other users for the same setting. As such, the user may select a value that potentially renders the software product non-functional. For example, an email client may fail to retrieve/send emails if values for network configuration parameters (e.g., port, authentication settings, etc.) are specified incorrectly.

Several embodiments of the disclosed technology can make telemetry insights available or visible to end users so that the end users can make data driven decisions in order to reduce or even avoid configuration errors. During installation and/or configuration of a software product in a computing device, a telemetry server can provide a user with information regarding values or selections that have been adopted by other users for a configuration parameter. Based on the displayed values, the user can select one of the values from the displayed list as a value for the setting, or the mostly commonly used value can be applied by default. As such, the user who is new to a software product can have confidence in that certain setting options are relative "safe," whereas others may cause potential errors. As a result, configuration errors in software products can be reduced, and user experience of software products can be improved, as described in more detail below with reference to FIGS. 1-5.

FIG. 1 is a schematic diagram illustrating a computing system 100 implementing telemetry driven configuration of software products in accordance with embodiments of the disclosed technology. As shown in FIG. 1, the computing system 100 can include one or more product servers 106 (illustrated as first and second product servers 106a and 106b, respectively) and a telemetry server 108 interconnected with client devices 102 (identified individually as first, second, and third client devices 102a, 102b, and 102c, respectively) associated with users 101 (identified individually as first, second, and third users 101a, 101b, and 101c, respectively) via a computer network 104. The computer network 104 can include an enterprise intranet, a social network, the Internet, or other suitable types of network.

Even though particular components and associated arrangements of the computing system 100 are shown in FIG. 1, in other embodiments, the computing system 100 can include additional and/or different components. For example, in the illustrated embodiment, the computing system 100 includes two, i.e., first and second product servers 106a and 106b. In other embodiments, the computing system 100 can include one, three, four, or any other suitable number of product servers 106. In yet other embodiments, the telemetry server 108 can be integrated with one or both of the product servers 106. In further embodiments, the computing system 100 can also include web servers, domain name servers, or other suitable components. In yet further embodiments, the telemetry server 108 can also include multiple servers and/or computing services provided by, for example, a cloud computing system (not shown). In additional embodiments, one or more of the product servers 106 may be omitted, and the users 101 can obtain software via physical media or other suitable ways.

The client devices 102 can individually include a computing device that facilitates access by the users 101 to the telemetry server 108 and/or the product servers 106 via the computer network 104. For example, in the illustrative embodiment, the client devices 102 individually include a desktop computer. In other embodiments, the client devices 102 can also include laptop computers, tablet computers, smartphones, or other suitable computing or communications devices. Even though three users 101 are shown in FIG. 1 for illustration purposes, in other embodiments, the computing system 100 can facilitate any suitable number of users 101 access to the telemetry server 108 and/or the product servers 106 via the computer network 104.

The product servers 106 can be configured to provide copies of software products to the users 101 via the computer network 104. In certain embodiments, the product servers 106 can include web servers configured to allow downloading of software applications, software updates/upgrades, or other suitable software programs. In other embodiments, the product servers 106 can include content distribution network servers configured to distribute copies of suitable software programs. Though two product servers 106 are shown in FIG. 1, in other embodiments, the computing system 100 can include any suitable number of product servers 106 related to or non-related to the telemetry server 108.

The telemetry server 108 can be configured to anonymously collect telemetry information related to installation, use, performance, or other suitable characteristics of software products installed and/or executing on the client devices 102. For example, the telemetry server 108 can collect telemetry information from the first and second client devices 102a and 102b values of configuration parameters, performance levels, error logs, operating environments, or other suitable information regarding an installed software product on the first and second client devices. In certain embodiments, the telemetry server 108 can only collect telemetry information from successful operations for generating recommendations. In other embodiments, the telemetry server 108 can also collect telemetry information from failed operations for generating warning or other suitable notifications. The telemetry server 108 can then store the collected telemetry information in a data store. In certain embodiments, the stored telemetry information can be updated with additional telemetry information periodically, for instance, every twelve hours. In other embodiments, the stored telemetry information can be updated every twenty-four hours, forty-eight hours, or other suitable periods of time.

The telemetry server 108 can also provide the collected telemetry information to the users 101 during installation or operation of the software product on the client devices 102. For example, in the illustrated embodiment, the third user 101c can download another copy of the software product from one of the product servers 106 and install the downloaded copy on the third client device 102c. During installation, with user consent, the third client device 102c can indicate to the telemetry server 108 that the third client device 102c has entered a configuration mode for the software product, for example, when a configuration wizard is initiated. In response, the telemetry server 108 can provide suitable telemetry information regarding values of configuration parameters related to the software product to the third client device 102c. The provided telemetry information can include, for instance, various values or selections the first and second users 101a and 101b have adopted for various configuration parameters of the software product. The third client device 102c can then output the received telemetry information to the third user 101c on, for example, a user interface (e.g., a display) of the third client device 102c. As such, even though the third user 101c may be new to the installed software product, the third user 101c can expect that certain values or selections for the configuration parameters are less likely to cause configuration errors than others, as described in more detail below with reference to FIGS. 2A-2D.

FIGS. 2A-2D are schematic diagrams illustrating certain hardware/software components of the computing system 100 in FIG. 1 during certain stages of configuring a software product on a client device 102. In FIGS. 2A-2D, certain components of the computing system 100 are omitted for clarity. For example, none of the product servers 106 or the client devices 102 are shown in FIGS. 2A-2D for clarity. Also, in FIGS. 2A-2D, a user interface of an example software product is shown for each of the client devices 102 instead of a schematic representations of the client devices 102 as shown in FIG. 1.

In addition, in FIGS. 2A-2D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

Figure 2A:
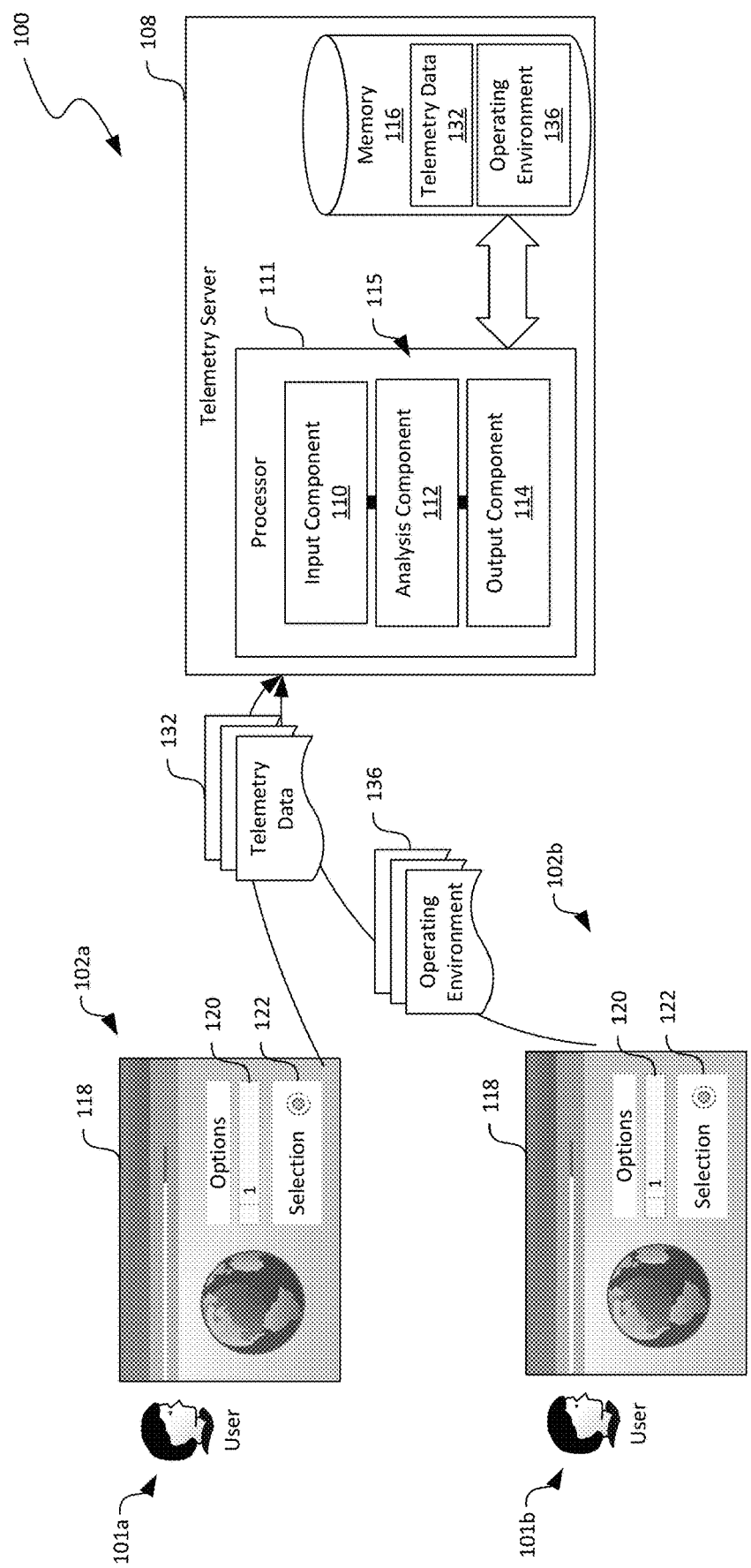
FIGS. 2A-2D are schematic diagrams illustrating certain hardware/software components of the computing system in FIG. 1 during certain operational stages in accordance with embodiments of the disclosed technology.

The telemetry server 108 can include a computing device having a processor 111 and a memory 116 containing instructions executable by the processor 111 to provide various software components. The processor 111 can include a microprocessor, a field-programmable gate array, and/or other suitable logic devices. The memory 116 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 111 (e.g., instructions for performing the methods discussed below with reference to FIGS. 4A-4B). As shown in FIG. 2A, the memory 116 can also contain records of telemetry data 132 representing collected telemetry information from the client devices 102 (FIG. 1) and/or other suitable data. An example computing device suitable for the telemetry server 108 is described below with reference to FIG. 5.

The processor 111 can execute instructions to provide a plurality of software components 115 configured to facilitate telemetry driven configuration of software products. As shown in FIG. 2A, the software components 115 can include an input component 110, an analysis component 112, and an output component 114 operatively coupled to one another. In one embodiment, all of the software components 115 can reside on a single computing device (e.g., a network server). In other embodiments, the software components 115 can also reside on a plurality of distinct computing devices. In further embodiments, the software components 115 may also include network interface components and/or other suitable modules or components (not shown).

The input component 110 can be configured to receive, from the client devices 102 (FIG. 1), telemetry data 132 related to a software product 118 and data representing profiles of operating environment 136 in which the software product 118 is executed. The telemetry data 132 can include one or more values for configuration parameters of the software product 118 installed or executing on the client devices 102. For example, in one embodiment, the telemetry data 132 can include a parameter identification (e.g., an alphanumeric string) distinctly identifying a configuration parameter (e.g., "Options" 120 in FIG. 2A). The telemetry data 132 can also include a value (e.g., "1") associated with the parameter identification. FIG. 2A also shows another configuration parameter, i.e., "Selection" 122 with an associated value of "On" for both the first and second client devices 102a and 102B. In other examples, the telemetry data 132 can also include data fields containing a version of the software product, a current status of the software product (e.g., operating normally or failed), an installation or last updated date/time of the software product, or other suitable information related to the software product.

The profile of operating environment 136 can include identifications of a type, version, or build of an operating system or another software product/component currently executed or installed on the client devices 102. For example, the profile of operating environment 136 can indicate that the first client device 102a (FIG. 1) is currently executing a Mac OS, while the second client device 102b (FIG. 1) is executing an iPhone OS both provided by Apple, Inc. of Cupertino, Calif. In other embodiments, the operating environment 136 can also include one or more operating modes of the client devices 102. For example, the profile of operating environment 136 can include data indicating that the first client device 102a is on AC power while the second client device 102b is on battery power. In further embodiments, the profile of the operating environment 136 can include data representing other suitable operating conditions, characteristics, or attributes on the client devices 102.

In certain embodiments, the input component 110 can periodically query the client devices 102 for the telemetry data 132 and/or the profile of operating environment 136. In other embodiments, the client devices 102 can transmit the foregoing data to the telemetry server 108 on a periodic basis, upon change, upon installation, upon configuration, or on other suitable basis. Upon receiving the foregoing data, the input component 110 can store/update the telemetry data 132 with corresponding profile of operating environment 136 in the memory 116. Even though FIG. 2A shows the foregoing data being stored in the memory 116 attached to the processor 111, in other embodiments, the foregoing data or a portion thereof can be stored in a network storage or other suitable storage locations.

Figure 2B:
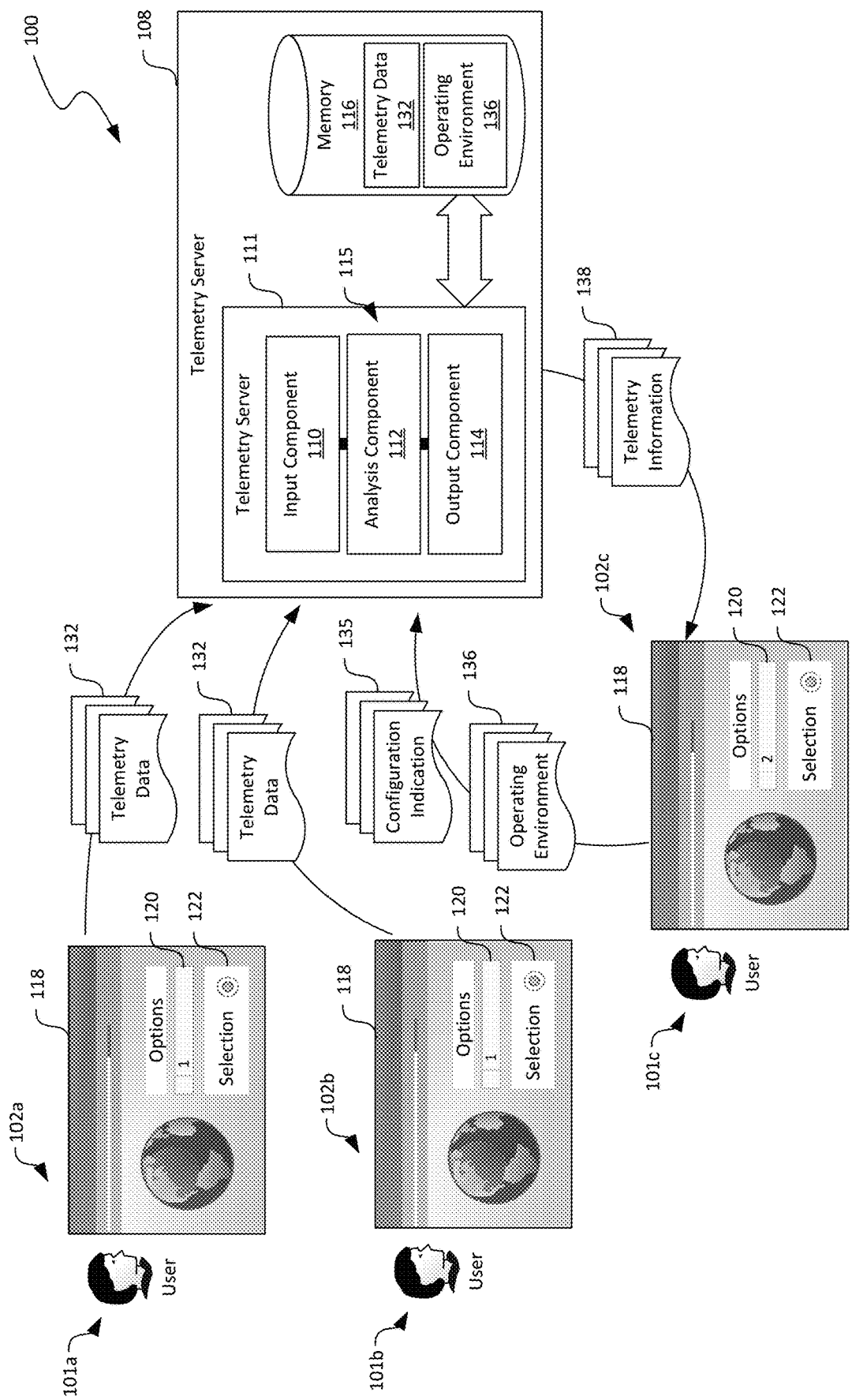

The software components 115 can also include an analysis component 112 and an output component 114 configured to facilitate telemetry driven configuration of software products, as described in more detail below with reference to FIG. 2B. As shown in FIG. 2B, the analysis component 112 can be configured to determine a recommended list of options for configuration parameters of the software product 118 on the third client device 102c based on a profile of operating environment 136 of the third client device 102c. In certain embodiments, upon user consent, the software product 118 can be configured to transmit a configuration indication 135 to the telemetry server 108 that the third client device 102c has entered a configuration mode for the software product 118. The software product 118 can also transmit the profile of the operating environment 136 of the third client device 136 to the telemetry server 108.

Upon receiving the configuration indication 135, the analysis component 112 can be configured to determine a list of telemetry information 138 for the configuration parameters of the software product 118 based on the stored telemetry data 132. In the example shown in FIG. 2B, the profile of operating environment 136 of the third client device 102c can indicate that the third client device 102c is running a copy of iPhone OS similar to the second client device 102b. In response, the analysis component 112 can retrieve records of values or selections associated with the second client device 102b as well as other client devices (not shown).

The analysis component 112 can then provide the retrieved records to the output component 114 to transmit as telemetry information 138 to the third client device 102c. For instance, the telemetry information 138 can indicate that the most commonly used value for "Options" 120 is "1" while the most commonly used value for "Selection" 122 is "On." In other embodiments, the analysis component 112 can also provide adoption rates, trends, or other suitable information related to the telemetry information 138, as described below with reference to FIGS. 2C and 2D. In further embodiments, the software product 118, with user consent, can also be configured to transmit a received user input (e.g., "2" for "Options" 120) to the telemetry server 108. In response, the analysis component 112 can determine a new set of telemetry information 138 based on both the profile of operating environment 136 of the third client device 102c and the user input to the configuration parameter "Options" 120. An example decision tree on how to generating the new set of telemetry information 138 is described in more detail below with reference to FIG. 3.

In certain embodiments, the analysis component 112 can also be configured to determine whether sufficient amount of telemetry data 132 is available to provide the telemetry information 138. In response to determining that insufficient amount of telemetry data 132 is available, the analysis component 112 can provide a default list of telemetry information 138, provide no telemetry information 138, or perform other suitable operations.

Figure 2C:
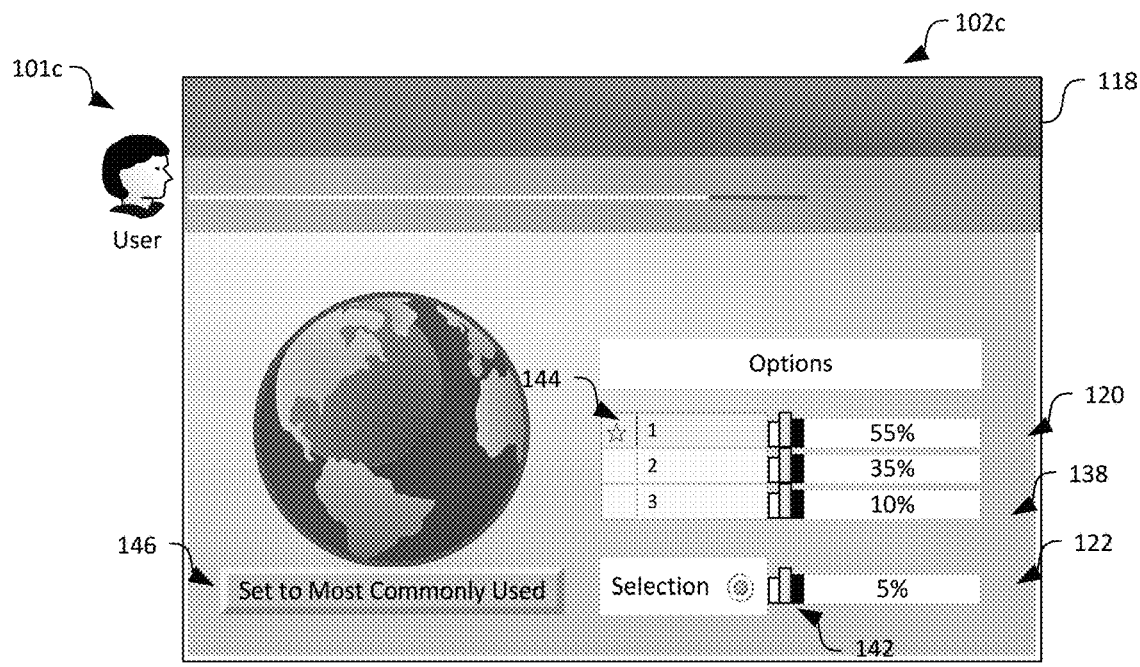

Upon receiving the telemetry information 138, the software product 118 (or a component of an operating system on the client device 102) can be configured to display the telemetry information 138 to the user 101. For example, as shown in FIG. 2C, the telemetry information 138 can include three values, i.e., "1," "2," and "3" related to Options 120, and one value, i.e., "On" related to "Selection" 122. Each values can be shown with corresponding adoption rates, i.e., "55%," "35%," and "10%" corresponding to "1," "2," and "3," respectively, and "5%" corresponding to "On" for "Selection" 122. The bar graph symbol 142 in FIG. 2C is used to denote data retrieved from the telemetry information 138. In other embodiments, other suitable symbols, texts, or indicators can also be used. In certain embodiments, a symbol (e.g., a star in FIG. 2C) can also be used to identify one of the values (e.g., "1") as the most commonly used value. In other embodiments, the values can be identified graphically or textually in other suitable manners.

As shown in FIG. 2C, in certain embodiments, the software product 118 can also include an input element (e.g., the "Set to Most Commonly Used" button in FIG. 2C) configured to apply the mostly commonly used values to the various configuration parameters. Thus, in the example in FIG. 2C, upon actuation by the user 101c, the most commonly used values (i.e., "1" and "On") can be applied to the configuration parameters (i.e., "Options" 120 and "Selection" 122), respectively. In other embodiments, the most commonly used values may be applied automatically by default or applied in other suitable manners.

Figure 2D:
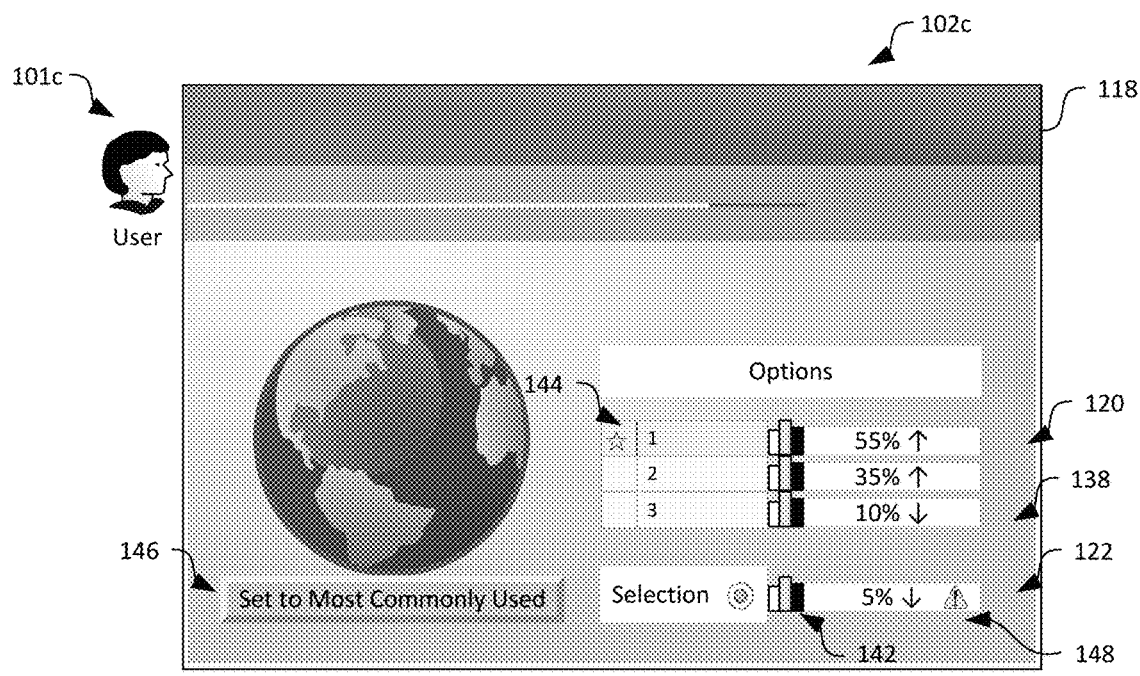

In further embodiments, the telemetry information 138 can also contain trending data related to each of the values. For instance, as shown in FIG. 2D, each of the values can be shown with a corresponding trend (i.e., up arrow indicating treading up or down arrow indicating treading down). In yet further embodiments, the telemetry information 138 can also include an indication that a selected value by the user 102c is likely to cause a configuration error. For instance, as shown in FIG. 2D, the value "On" for "Selection" 122 has an adoption rate of 5%, and can likely cause a configuration error, as indicated by the warning sign 148.

Figure 3:
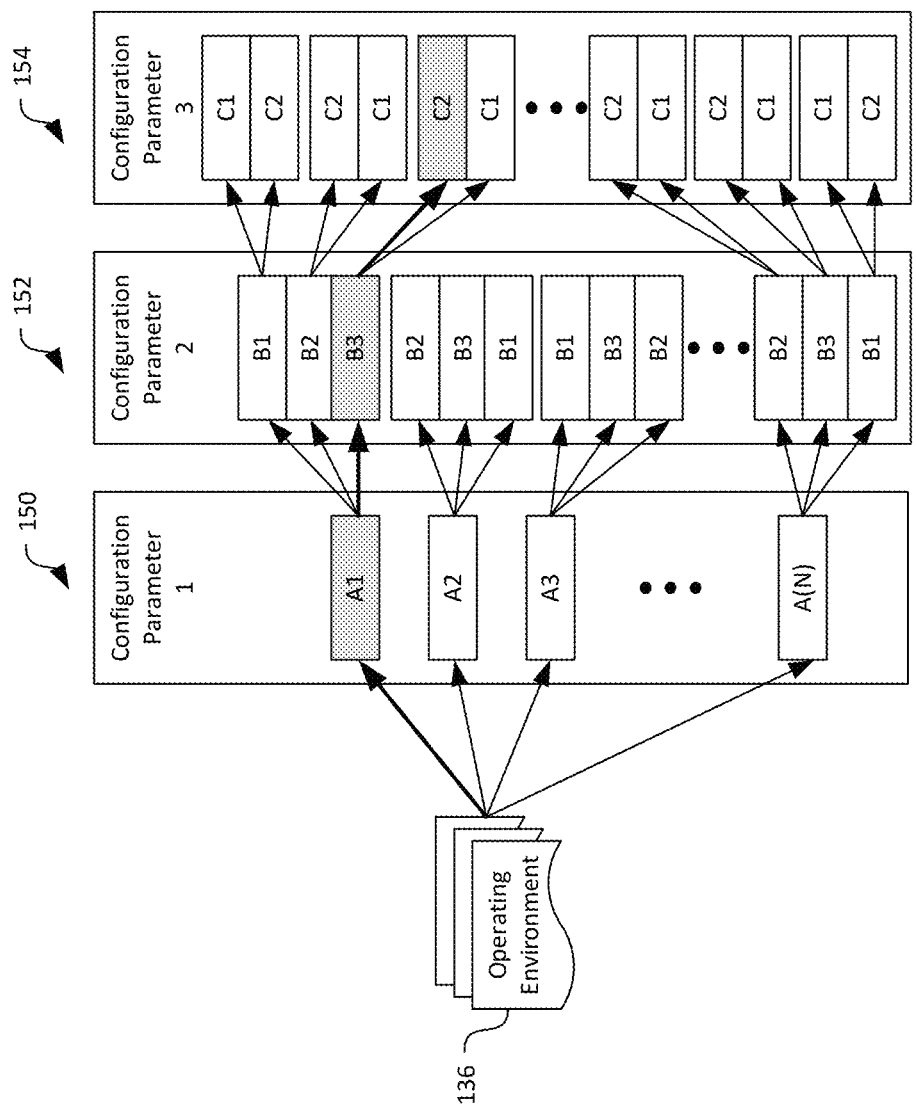
FIG. 3 is a schematic diagram illustrating an example decision tree for retrieving relevant telemetry data in accordance with embodiments of the disclosed technology.

FIG. 3 is a schematic diagram illustrating an example decision tree for retrieving relevant telemetry data 138 in accordance with embodiments of the disclosed technology. Operations related to the example decision tree can be performed by the analysis component 112 of the telemetry server 108 in FIGS. 2A and 2B. Though only three configuration parameters are shown in FIG. 3, in other embodiments, any one, two, four, five, or any suitable number of configuration parameters may be used.

As shown in FIG. 3, upon receiving the profile of operating environment 136, the analysis component 112 can be configured to identify a first configuration parameter 150 corresponding thereto. In the example shown in FIG. 3, the first configuration parameter 150 can be associated with N (where N is an integer) values, identified as A1, A2, . . . A(N), previously used by users 102 (FIG. 1) with the values shown in order of descending adoption rates. Thus, A1 is the most commonly used value in FIG. 3. Each values A1, A2, . . . A(N) can each be associated with different sets of values, i.e., B1, B2, and B3 for the second configuration parameter 152.

As such, upon receiving an indication that a user 102 (FIG. 1) has selected a particular value for the first configuration parameter 150, the analysis component 112 can retrieve different sets of values for the second configuration parameter 152. For example, as shown in FIG. 3, if the user 102 selects A1, then the analysis component 112 can provide a set having B1, B2, and B3 for the second configuration parameter 152. If the user 102 selects A2, the analysis component 112 can provide another set having B2, B3, and B1 for the second configuration parameter 152. Thus, depending on which value of the first configuration parameter 150 the user 102 selects, the most commonly used value for the second configuration parameter 152 can change. Similarly, depending on which value of the second configuration parameter 152 the user selects, the most commonly used value for the third configuration parameter 154 can change. For instance, as shown in FIG. 3, if the user 102 selects B3, then the most commonly used value for the third configuration parameter 154 would be C2.

Figure 4A:
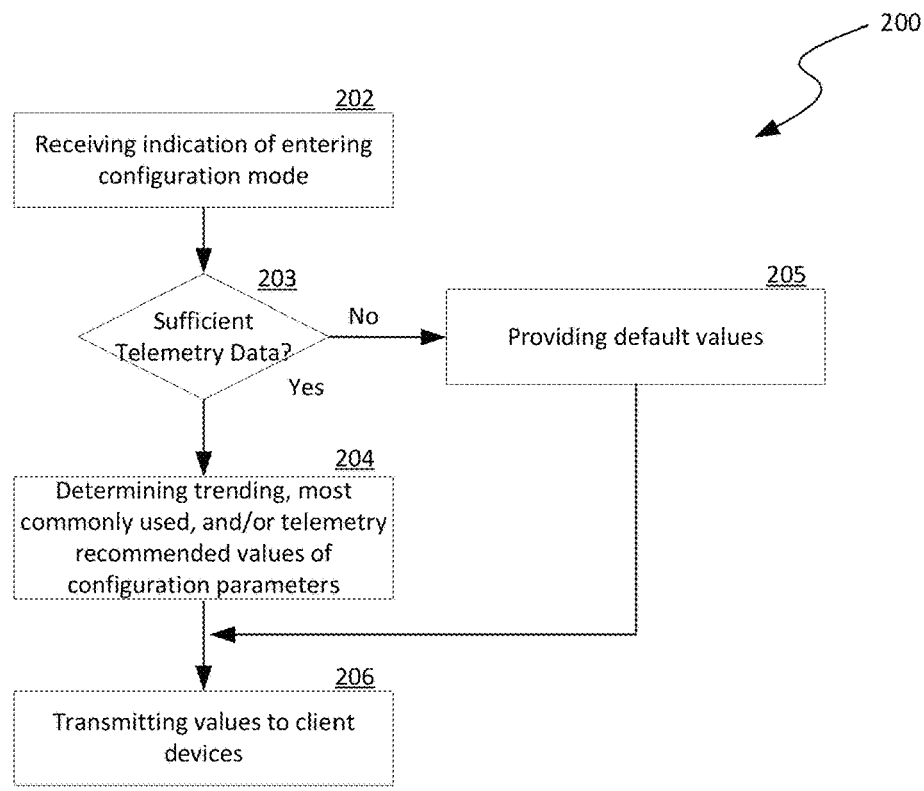
FIGS. 4A-4B are flowcharts illustrating various aspects of processes of telemetry driven configuration of software products in accordance with embodiments of the disclosed technology.
Figure 4B:
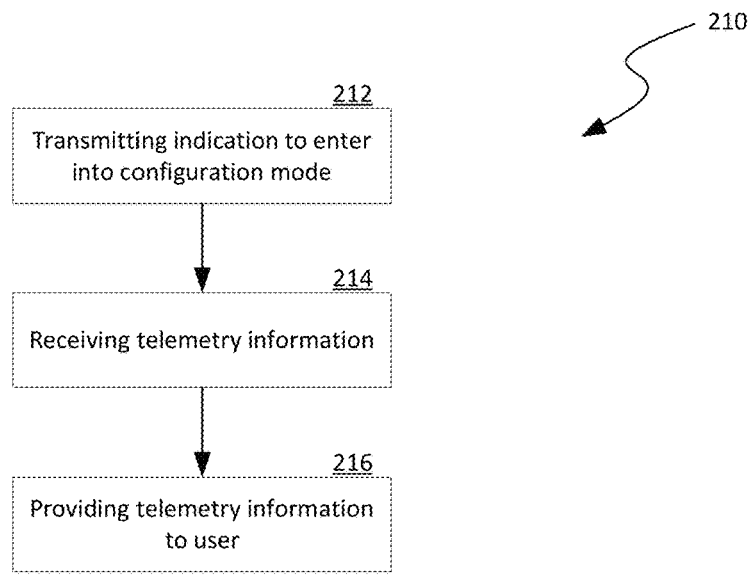

FIGS. 4A-4B are flowcharts illustrating various aspects of processes of facilitating telemetry driven configuration of software products in accordance with embodiments of the disclosed technology. Even though the processes are described below with reference to the computing system 100 of FIG. 1, in other embodiments, embodiments of the processes can be performed in other computing systems with additional and/or different components.

FIG. 4A is a flowchart illustrating a process 200 of facilitating telemetry driven configuration of software products in accordance with embodiments of the disclosed technology. As shown in FIG. 4A, at stage 202, the process 200 can include receiving an indication from a client device that the client device has entered a configuration mode, for example, a configuration page is displayed or a configuration wizard is initiated. The process 200 can then include a decision stage 203 to determine whether sufficient telemetry data exists. Telemetry data is deemed sufficient when telemetry data has been collected from a threshold number of client device, for a threshold period of time, or based on other suitable criteria. In response to determining that sufficient telemetry data exists, the process 200 can include determining trending, most commonly used, telemetry recommended values for one or more configuration parameters of the software product at stage 204. In certain embodiments, the values can be determined based on a profile of operating environment on the client device and values of the same configuration parameter received from multiple additional client devices associated with additional users. The determined values are used by one or more of the additional users for the configuration parameter in the same operating environment. In other embodiments, the values can be determined based on values collected during beta testing, survey results, or data generated from related researches. In response to determining that sufficient telemetry data exists, the process 200 can include providing default values for one or more configuration parameters of the software product at stage 205.

The process 200 can then include transmitting the determined values to the client device at stage 206. The transmitted values can be recommended values for use by the user when configuring the software product in the configuration mode. As such, with such knowledge, the user can reduce a risk of configuration error of the software product executed on the client device.

FIG. 4B is a flowchart illustrating another process 210 of facilitating telemetry driven configuration of software products in accordance with embodiments of the disclosed technology. As shown in FIG. 4B, the process 210 can include transmitting an indication that a client device has entered a configuration mode for configuring a software product at stage 212. The process 210 can then include receiving telemetry information related to one or more configuration parameters related to configuring the software product at stage 214. The telemetry information contains a value for the configuration parameter and an adoption rate of the value by additional users for the same configuration parameter of the software product in the same operating environment. The process 210 can also include providing the received telemetry information to the user at stage 216. In one embodiment, providing the telemetry information can include displaying the received telemetry information on a user interface of the client device. In other embodiments, providing the telemetry information can include applying one or more most commonly used values to the configuration parameters automatically.

Figure 5:
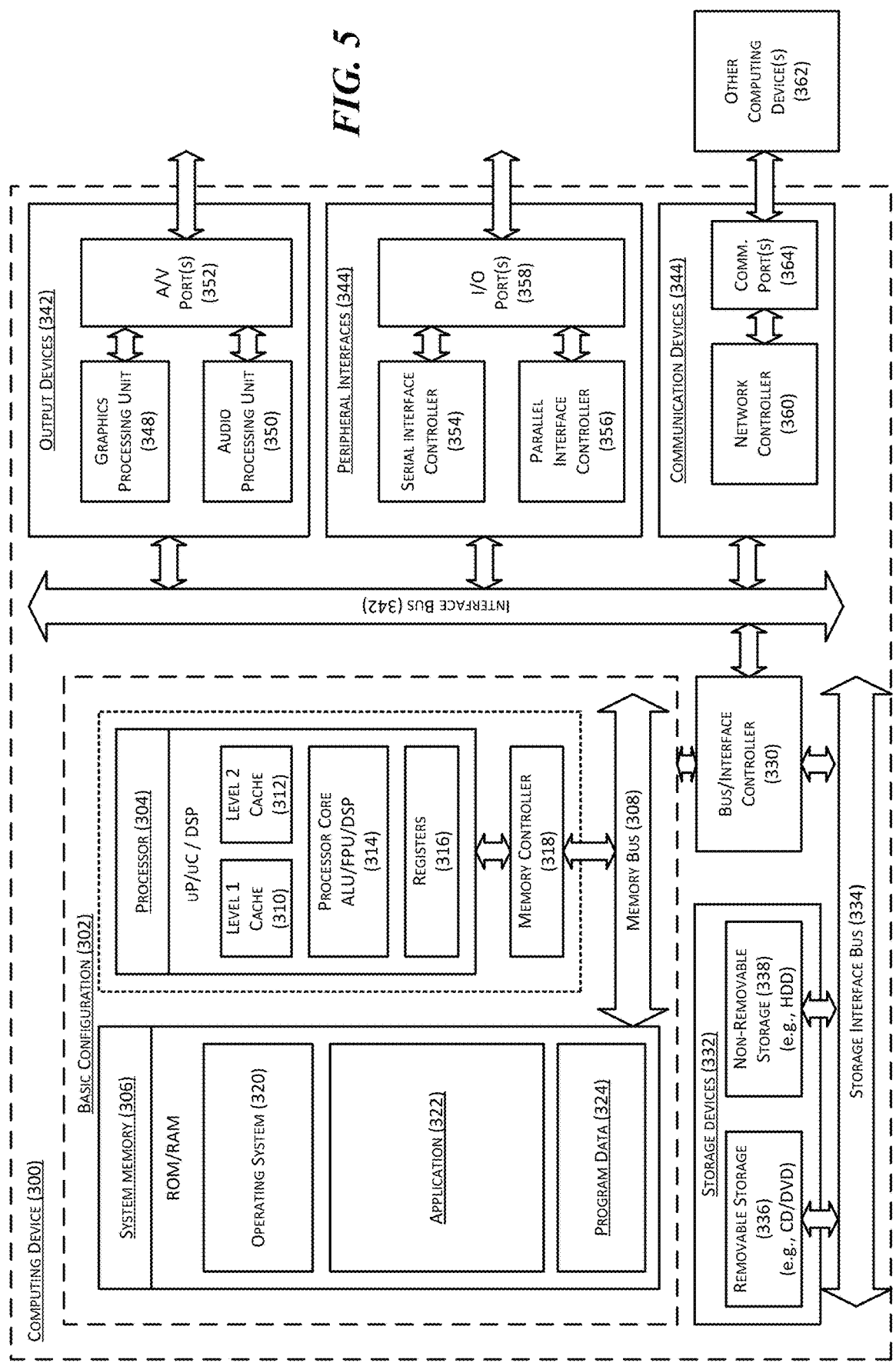
FIG. 5 is a computing device suitable for certain components of the computing system in FIG. 1.

FIG. 5 is a computing device 300 suitable for certain components of the computing system 100 in FIG. 1. For example, the computing device 300 can be suitable for the product servers 106, the telemetry server 108, or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of telemetry driven configuration in a computing device, the method comprising:
  receiving, via a computer network, an indication of a software product entering into a configuration mode and data representing a profile of an operating environment in which the software product is being executed on a client device;
  determining a first set of values for a first configuration parameter of the software product based on (i) the received profile of the operating environment on the client device and (ii) multiple values of the same first configuration parameter received from multiple additional client devices, the determined first set of values being values used by one or more of the additional client devices for the first configuration parameter in the same operating environment;
  transmitting, via the computer network, the determined first set of values of the first configuration parameter to the client device when configuring the software product in the configuration mode; and
  upon detecting a selection of one of the transmitted first set of values of the first configuration parameter at the client device,
    determining a second set of values for a second configuration parameter corresponding to the selected one of the first set of values of the first configuration parameter according to the detected selection of the one of the first set of values, wherein the second set of values are different than the first set of values; and
    transmitting, via the computer network, the determined second set of values of the second configuration parameter to the client device when configuring the software product in the configuration mode.

2. The method of claim 1 wherein determining the first set of values for the first configuration parameter includes:
  determining a set of values of the first configuration parameter received from the additional client devices, the determined set of values corresponding to an operating environment that matches the received profile of the operating environment of the client device; and
  selecting a most commonly used successful value from the set of values as a recommended value for use by the client device.

3. The method of claim 1 wherein determining the first set of values for the first configuration parameter includes:
  determining a set of values of the first configuration parameter received from the additional client devices, the determined set of values corresponding to an operating environment that matches the received profile of the operating environment of the client device;
  determining a frequency of use corresponding to each of the values in the determined set of values; and
  selecting a value from the set of values based on the determined frequencies of use as a recommended value for use by the client device.

4. The method of claim 1 wherein:
  the one of the first set of values is a first value for the first configuration parameter of the software product, the first value having a corresponding first usage level by the additional client devices;
  the method also includes determining a second value for the first configuration parameter of the software product based on (i) the received profile of the operating environment on the client device and (ii) multiple values of the same first configuration parameter received from additional client devices via the computer network, the second value having a corresponding second usage level by the additional client devices, wherein the second usage level being less than the first usage level; and
  transmitting the first set of values includes transmitting, via the computer network, the first and second determined values with corresponding first and second usage levels, respectively, to the client device.

5. The method of claim 1 wherein:
  the one of the first set of values is a first value for the first configuration parameter of the software product, the first value having a corresponding first usage level by the additional client devices and a first trend associated with the first usage level;
  the method also includes determining a second value for the first configuration parameter of the software product based on (i) the received profile of the operating environment on the client device and (ii) multiple values of the same first configuration parameter received from additional client devices via the computer network, the second value having a corresponding second usage level by the additional client devices and a second trend associated with the second usage level, wherein the second usage level is less than the first usage level; and
  transmitting the first set of values includes transmitting, via the computer network, the first and second determined values with corresponding first and second usage levels and the first and second trends, respectively, to the client device.

6. The method of claim 1 wherein:
  the first set of values are ranked based on corresponding usage levels by the additional client devices; and
  transmitting the first set of values includes transmitting, via the computer network, the first set of values with the corresponding usage levels and ranked based on the corresponding usage levels to the client device.

7. The method of claim 1, further comprising:
  receiving another indication that an input value to the first configuration parameter is received at the client device;
  in response to receiving the another indication, determining a usage level, a frequency of use, or a usage ranking corresponding to the input value at the client device from the user; and transmitting the determined usage level, frequency of use, or usage ranking corresponding to the input value to the client device.

8. The method of claim 1, further comprising:
receiving another indication that an input value to the first configuration parameter is received at the client device;
in response to receiving the another indication, determining a risk of configuration error corresponding to the input value at the client device based on the determined first set of values; and
transmitting the determined risk of configuration error corresponding to the input value to the client device.

9. The method of claim 1 wherein the first set of values include a most commonly used successful value by the additional client devices for the first configuration parameter in the same operating environment.

10. A computing device associated with a user, comprising:
a processor;
a memory operatively coupled to the processor, the memory containing instructions executable by the processor to cause the computing device to:
transmit, via a computer network to a server, an indication of a software product entering a configuration mode for a first configuration parameter and data representing a profile of an operating environment in which the software product is being executed on the computing device;
receive, from the server via the computer network, data of telemetry information related to the first configuration parameter, the telemetry information containing a first set of values for the first configuration parameter and an adoption rate of the values by additional computing devices for the same first configuration parameter of the software product in the same operating environment;
display, on a user interface of the computing device, the received first set of values for the first configuration parameter and the corresponding adoption rate of the values by the additional computing devices for the same first configuration parameter of the software product in the same operating environment; and
upon detecting selection of one of the displayed first set of values of the first configuration parameter at the computing device, automatically set, by the processor of the computing device, a second value to a second configuration parameter of the software product executing on the computing device, wherein the second value of the second configuration parameter is selected from a second set of multiple candidate values of the second configuration parameter according to the detected selection of the one of the first set of values, and wherein the second value is different than the one of the first set of values corresponding to the detected selection.

11. The computing device of claim 10 wherein the memory contains additional instructions executable by the processor to cause the computing device to:
detect a user selection of the first configuration parameter;
upon detecting the user selection, determine whether the selected first configuration parameter is registered to receive telemetry information; and
in response to determining that the selected first configuration parameter is registered to receive telemetry information, transmit, via the computer network to the server, the indication of the software product entering the configuration mode for the first configuration parameter and the data representing the profile of the operating environment in which the software product is being executed on the computing device.

12. The computing device of claim 10 wherein:
the one of the first set of values is a first value for the first configuration parameter;
the adoption rate is a first adoption rate;
the telemetry information also contains a second value for the first configuration parameter and a second adoption rate of the second value by the additional computing devices for the same first configuration parameter of the software product in the same operating environment;
the second value of the first configuration parameter is different than the first value; and
the second adoption rate is lower than the first adoption rate.

13. The computing device of claim 10 wherein:
the one of the first set of values is a first value for the first configuration parameter;
the adoption rate is a first adoption rate;
the telemetry information also contains a second value for the first configuration parameter and a second adoption rate of the second value by the additional computing devices for the same first configuration parameter of the software product in the same operating environment, the second adoption rate being lower than the first adoption rate; and
to display the received first set of values includes to display, on the user interface of the computing device, both the first and second values for the first configuration parameter and the first and second adoption rates.

14. The computing device of claim 10 wherein:
the one of the first set of values is a first value for the first configuration parameter;
the adoption rate is a first adoption rate;
the telemetry information also contains a second value for the first configuration parameter and a second adoption rate of the second value by the additional computing devices for the same first configuration parameter of the software product in the same operating environment, the first adoption rate being higher than the second adoption rate; and
the memory contains additional instructions executable by the processor to cause the computing device to apply the first value as a default selection for the first configuration parameter based on the first adoption rate of the first value being higher than the second adoption rate of the second value of the first configuration parameter.

15. The computing device of claim 10 wherein the memory contains additional instructions executable by the processor to cause the computing device to:
receive, from the user, an input value for the first configuration parameter;
transmit the input value associated with the first configuration parameter to the server; and
receive, from the server, additional telemetry information related to the second configuration parameter, the additional telemetry information containing another value for the second configuration parameter and another adoption rate by the additional computing devices for the same second configuration parameter when additional users select the input value for the first configuration parameter.

16. The computing device of claim 15 wherein:

the input value is a first input value;

the memory contains additional instructions executable by the processor to cause the computing device to:

receive, from the user, a user input to modify the first input value to a second input value for the first configuration parameter;

transmit the second input value associated with the first configuration parameter to the server; and receive, from the server, further telemetry information related to the second configuration parameter, the further telemetry information containing a further value for the second configuration parameter and a further adoption rate of the further value by the additional computing devices for the same second configuration parameter when additional users select the second input value for the first configuration parameter, the further value being different than the another value for the second configuration parameter.

17. The computing device of claim 10 wherein the memory contains additional instructions executable by the processor to cause the computing device to:

receive an input value for the first configuration parameter;

transmit the input value associated with the first configuration parameter to the server;

receive, from the server, additional telemetry information related to the first configuration parameter, the additional telemetry information containing an adoption rate of the input value by the additional computing devices for the first configuration parameter;

determine whether the received adoption rate of the input value is lower than a threshold; and in response to determining that the adoption rate of the input value is lower than the threshold, display, on the user interface, a warning of potential configuration error for the first configuration parameter.

18. A method of telemetry driven configuration in a computing device, the method comprising:

transmitting, via a computer network to a server, an indication of a software product on the computing device entering a configuration mode for a first configuration parameter of the software product;

receiving, from the server via the computer network, data of telemetry information related to the first configuration parameter, the telemetry information containing a list of first values for the first configuration parameter each previously adopted by additional computing devices for the same first configuration parameter of the software product;

displaying, on a user interface of the computing device, the received list of first values for the first configuration parameter;

indicating, on the user interface of the computing device, that one of the displayed first values in the list is most commonly adopted by the additional computing devices; and upon detecting selection of one of the displayed first values of the first configuration parameter at the computing device, automatically set, by the computing device, a second value to a second configuration parameter of the software product executing on the computing device, wherein the second value of the second configuration parameter is selected from a second set of multiple candidate values of the second configuration parameter according to the detected selection of the one of the first values, and wherein the second value is different than the one of the first values corresponding to the detected selection.

19. The method of claim 18, further comprising:

receiving an input to apply the most commonly adopted value for the first configuration parameter; and in response to receiving the input, applying the most commonly adopted value in the received list for the first configuration parameter.

20. The method of claim 18 wherein displaying the received list of first values includes automatically applying the most commonly used value in the received list as a default value for the first configuration parameter.

* * * * *